(12) United States Patent
Huang

(10) Patent No.: US 12,320,665 B2
(45) Date of Patent: Jun. 3, 2025

(54) METHOD AND APPARATUS FOR CONTINUOUS PATH PLANNING, COMPUTER DEVICE, AND STORAGE MEDIUM

(71) Applicant: Shenzhen University, Guangdong (CN)

(72) Inventor: Hui Huang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 710 days.

(21) Appl. No.: 17/566,221

(22) Filed: Dec. 30, 2021

(65) Prior Publication Data

US 2022/0350333 A1 Nov. 3, 2022

(30) Foreign Application Priority Data

Apr. 28, 2021 (CN) .......................... 202110462795.8

(51) Int. Cl.
| | |
|---|---|
| G05D 1/00 | (2024.01) |
| B64U 20/87 | (2023.01) |
| B64U 101/32 | (2023.01) |
| G01C 21/00 | (2006.01) |
| G05D 1/644 | (2024.01) |
| G05D 105/80 | (2024.01) |
| G06N 5/01 | (2023.01) |

(52) U.S. Cl.
CPC ......... G01C 21/3811 (2020.08); G05D 1/644 (2024.01); G06N 5/01 (2023.01); *B64U 20/87* (2023.01); *B64U 2101/32* (2023.01); *B64U 2201/10* (2023.01); *G05D 2105/87* (2024.01)

(58) Field of Classification Search
CPC .... G05D 1/00; G06N 5/01–013; B64C 39/00; G01C 21/00; G08G 1/00
USPC ........................................ 701/2–18, 400–541
See application file for complete search history.

(56) References Cited

U.S. PATENT DOCUMENTS

| | | | | |
|---|---|---|---|---|
| 9,120,485 B1* | 9/2015 | Dolgov | ............... | B62D 15/025 |
| 2010/0174435 A1* | 7/2010 | Lim | ..................... | G05D 1/0217 |
| | | | | 701/25 |
| 2011/0035050 A1* | 2/2011 | Kim | ..................... | G05D 1/0214 |
| | | | | 901/1 |
| 2011/0035087 A1* | 2/2011 | Kim | ..................... | G05D 1/0274 |
| | | | | 701/25 |

(Continued)

OTHER PUBLICATIONS

J. Li and C. Yang, "AUV Path Planning Based on Improved RRT and Bezier Curve Optimization," 2020 IEEE International Conference on Mechatronics and Automation (ICMA), Beijing, China, 2020, pp. 1359-1364, doi: 10.1109/ICMA49215.2020.9233842. (Year: 2020).*

(Continued)

*Primary Examiner* — Rami Khatib
*Assistant Examiner* — Paul Allen
(74) *Attorney, Agent, or Firm* — GREENBLUM & BERNSTEIN, P.L.C.

(57) ABSTRACT

A method, an apparatus for continuous path planning, a computer device, and a storage medium. The method designs the optimization function based on the rapidly exploring random tree to plan path, and the optimal path is screened out from the random tree according to target function including the reconstruction completeness optimization function, the path effectiveness optimization function, and the path smoothness optimization function when the reconstruction degree of the preset sampling points is determined to meet the preset requirement.

10 Claims, 6 Drawing Sheets

(56) References Cited

U.S. PATENT DOCUMENTS

| | | | | |
|---|---|---|---|---|
| 2011/0106306 A1* | 5/2011 | Kim | ............... | B25J 9/1664 |
| | | | | 901/1 |
| 2014/0121833 A1* | 5/2014 | Lee | ............... | G05D 1/0217 |
| | | | | 901/1 |
| 2017/0241790 A1* | 8/2017 | Yoshikawa | ........ | G01C 21/3415 |
| 2020/0027225 A1* | 1/2020 | Huang | ............... | G06T 7/73 |
| 2020/0348145 A1* | 11/2020 | Paranjpe | ............ | G01C 21/3676 |
| 2020/0404166 A1* | 12/2020 | Ono | ............... | G05D 1/0094 |

OTHER PUBLICATIONS

Schmid, Lukas & Pantic, Michael & Khanna, Raghav & Ott, Lionel & Siegwart, Roland & Nieto, Juan. (2020). An Efficient Sampling-Based Method for Online Informative Path Planning in Unknown Environments. IEEE Robotics and Automation Letters. 5. 1-1. 10.1109/LRA.2020.2969191. (Year: 2020).*

Hernández JD, Istenič K, Gracias N, Palomeras N, Campos R, Vidal E, García R, Carreras M. Autonomous Underwater Navigation and Optical Mapping in Unknown Natural Environments. Sensors (Basel). Jul. 26, 2016;16(8):1174. doi: 10.3390/s16081174. PMID: 27472337; PMCID: PMC5017340. (Year: 2016).*

W. Tabib, M. Corah, N. Michael and R. Whittaker, "Computationally efficient information-theoretic exploration of pits and caves," 2016 IEEE/RSJ International Conference on Intelligent Robots and Systems (IROS), Daejeon, Korea (South), 2016, pp. 3722-3727, doi: 10.1109/IROS.2016.7759548. (Year: 2016).*

* cited by examiner

METHOD AND APPARATUS FOR CONTINUOUS PATH PLANNING, COMPUTER DEVICE, AND STORAGE MEDIUM

CROSS REFERENCE TO RELATED APPLICATIONS

This application claims priority to Chinese Patent Application No. 2021104627958, filed on Apr. 28, 2021, entitled "METHOD AND APPARATUS FOR PATH PLANNING, COMPUTER DEVICE, AND STORAGE MEDIUM", and the entire content of which is incorporated herein by reference.

TECHNICAL FIELD

The present disclosure relates to the field of path planning technology, and particularly to a method and an apparatus for continuous path planning, a computer device, and a computer-readable storage medium.

BACKGROUND

With the rapid development of the drone technology, drone-based technology image capturing technology is becoming mature and has become the focus of research.

All the existing target scene reconstruction-oriented path planning methods first calculate an optimal viewpoint set for image capturing based on the three-dimensional prior geometric information of the target scene, and then other algorithms such as the Travelling Salesman Problem algorithm are used to connect the optimized viewpoint set into a path. And finally, a planned path which is provided for the drone to complete the capturing task is obtained. The strategy of first determining the viewpoints for image capturing then connecting the viewpoints into a path makes the planned path ignores the capturing point that may exist in the path from one viewpoint to the next viewpoint and help improve the quality of reconstruction, thereby resulting waste of resources. Further, the target of optimization in the process of path planning is the viewpoints, which makes it difficult to guarantee or adjust the smoothness of the path during the planning process. The planned path is too long, which makes the energy consumption of the drone to be high, so that the data collection time is elongated and the data collection efficiency is affected.

It can be seen that the existing method for path planning has the problem of low data collection efficiency.

SUMMARY

In view of this, it is necessary to provide a method and an apparatus for continuous path planning, a computer device, and a storage medium which can improve the data collection efficiency to address the above technical problem.

A method for continuous path planning, including:
acquiring scene prior geometric information and a random tree;
determining whether a reconstruction degree of preset sampling points of the scene prior geometric information meets a preset requirement;
generating a newly-added node randomly in a preset barrier-free area if the reconstruction degree of the preset sampling points does not meet the preset requirement;
searching in the random tree for nodes located within a preset range of the newly-added node to obtain a node set;
screening out a target node from the node set to connect the newly-added node to the target node; the target node maximizes a preset target function corresponding to a path which ends with the newly-added node;
performing sub-tree reconnection operation on the newly-added node to update the random tree, and returning to the step of determining whether a reconstruction degree of the preset sampling points of the scene prior geometric information meets the preset requirement; and
screening out an optimal path from the newest random tree when the reconstruction degree of the preset sampling points meets the preset requirement; the optimal path maximizes the preset target function;
the preset target function comprises reconstruction completeness optimization function, path effectiveness optimization function, and path smoothness optimization function.

In an embodiment, the screening out the optimal path from the newest random tree includes:
acquiring a reconstruction contribution degree, a steering consumption value, and a travel distance consumption value of each feasible path for the feasible paths of the newest random tree; the feasible path is a path where the coverage of the preset sampling points reaches a preset requirement;
obtaining a target function value corresponding to each feasible path based on the reconstruction contribution degree, the steering consumption value, and the travel distance consumption value, and by combining the reconstruction completeness optimization function, the path effectiveness optimization function, and the path smoothness optimization function; and
determining the feasible path with the largest target function value as the optimal path.

In an embodiment, the acquiring the reconstruction contribution degree of each feasible path includes:
acquiring a known reconstruction contribution degree set;
finding in the reconstruction contribution degree set the reconstruction contribution degree corresponding to the image capturing device closest to a current image capturing device to obtain a target reconstruction contribution degree;
determining the target reconstruction contribution degree as the reconstruction contribution degree of the current image capturing device; and
obtaining a reconstruction contribution degree of each feasible path based on the reconstruction contribution degree of the image capturing device on each feasible path.

In an embodiment, the acquiring the steering consumption value of each feasible path includes:
determining lens orientation of each node on the feasible path; and
obtaining the steering consumption value of each feasible path according to the lens orientation of each node.

In an embodiment, the determining the lens orientation of each node on the feasible path includes:
acquiring lens parameters of the image capturing device and a preset lens orientation;
determining lens orientation of a current node as the preset lens orientation when the lens parameters of the image capturing device is characterized as multi-lens; and obtaining position information of the current node and position information and lens orientation of the parent node of the current node when the lens parameters of the image capturing device is characterized as single-lens, and executing preset lens orientation calculation strategy based on the position information of the current node and the position information and the lens orientation of the parent node of the current node to determine lens orientation of the current node, and then determining the lens orientation of each node on the feasible path.

In an embodiment, the method further includes:
screening out in the random tree a node with the closest distance to the newly-added node to connect the newly-added node to the node when the node set is empty after the searching in the random tree for the nodes located within the preset range of the newly-added node to obtain the node set.

In an embodiment, the acquiring the random tree includes:
acquiring a starting navigation point and lens orientation corresponding to the starting navigation point; and
initializing the random tree with the starting navigation point and the lens orientation corresponding to the starting navigation point as a root node.

An apparatus for continuous path planning, including:
a data acquiring module, configured to acquire scene prior geometric information and a random tree;
a reconstruction degree determination module, configured to determine whether a reconstruction degree of preset sampling points of the scene prior geometric information meets a preset requirement;
a node generation module, configured to generate a newly-added node randomly in a preset barrier-free area if the reconstruction degree of the preset sampling points does not meet the preset requirement;
a node searching module, configured to search in the random tree for nodes located within a preset range of the newly-added node to obtain a node set;
a node connection module, configured to screen out a target node from the node set to connect the newly-added node to the target node; the target node maximizes a preset target function corresponding to a path which ends with the newly-added node;
a sub-tree reconnection module, configured to perform sub-tree reconnection operation on the newly-added node to update the random tree, and return to the step of determining whether a reconstruction degree of preset sampling points of the scene prior geometric information meets a preset requirement; and
a path screening module, configured to screen out an optimal path from the newest random tree when the reconstruction degree of the preset sampling points meets the preset requirement; the optimal path maximizes the preset target function;
the preset target function comprises reconstruction completeness optimization function, path effectiveness optimization function, and path smoothness optimization function.

A computer device, including a processor and a memory storing a computer program, the processor, when executing the computer program, implements the following steps:
acquiring scene prior geometric information and a random tree;
determining whether a reconstruction degree of preset sampling points of the scene prior geometric information meets a preset requirement;
generating a newly-added node randomly in a preset barrier-free area if the reconstruction degree of the preset sampling points does not meet the preset requirement;
searching in the random tree for nodes located within a preset range of the newly-added node to obtain a node set;
screening out a target node from the node set to connect the newly-added node to the target node; the target node maximizes a preset target function corresponding to a path which ends with the newly-added node;
performing sub-tree reconnection operation on the newly-added node to update the random tree, and returning to the step of determining whether a reconstruction degree of preset sampling points of the scene prior geometric information meets a preset requirement; and
screening out an optimal path from the newest random tree when the reconstruction degree of the preset sampling points meets the preset requirement; the optimal path maximizes the preset target function;
the preset target function comprises reconstruction completeness optimization function, path effectiveness optimization function, and path smoothness optimization function.

A computer-readable storage medium on which a computer program is stored, the computer program is executed by a processor to implements the following steps:
acquiring scene prior geometric information and a random tree;
determining whether a reconstruction degree of preset sampling points of the scene prior geometric information meets a preset requirement;
generating a newly-added node randomly in a preset barrier-free area if the reconstruction degree of the preset sampling points does not meet the preset requirement;
searching in the random tree for nodes located within a preset range of the newly-added node to obtain a node set;
screening out a target node from the node set to connect the newly-added node to the target node; the target node maximizes a preset target function corresponding to a path which ends with the newly-added node;
performing sub-tree reconnection operation on the newly-added node to update the random tree, and returning to the step of determining whether a reconstruction degree of preset sampling points of the scene prior geometric information meets a preset requirement; and
screening out an optimal path from the newest random tree when the reconstruction degree of the preset sampling points meets the preset requirement; the optimal path maximizes the preset target function;
the preset target function comprises reconstruction completeness optimization function, path effectiveness optimization function, and path smoothness optimization function.

The above-mentioned method and apparatus, computer device, and storage medium for continuous path planning design the optimization function based on the rapidly exploring random tree to plan path, and the optimal path is screened out from the random tree according to target function including the reconstruction completeness optimization function, the path effectiveness optimization function, and the path smoothness optimization function when the reconstruction degree of the preset sampling points is determined to meet the preset requirement. The above method eliminates the traditional approach of taking viewpoint as the optimization object and takes the path as the optimization object to design the path smoothness optimization function. The influence of the path smoothness degree on collection time and energy consumption is taken into account, so that the planned path is shorter and smoother, thereby saving time and energy consumption of data collection. At the same time, the path effectiveness optimization function and the reconstruction completeness optimization function are designed, which can further improve the effectiveness and quality of the data collected. In summary, the method provided in the present disclosure can effectively improve the efficiency of data collection.

DETAILED DESCRIPTION

In order to make the purpose, technical solution and advantages of the present disclosure clearer, the present disclosure will be described in further detail in conjunction with the accompanying drawings and embodiments. It should be understood that the specific embodiments described herein are only used for explaining the present disclosure, rather than limiting the present disclosure.

Figure 1:
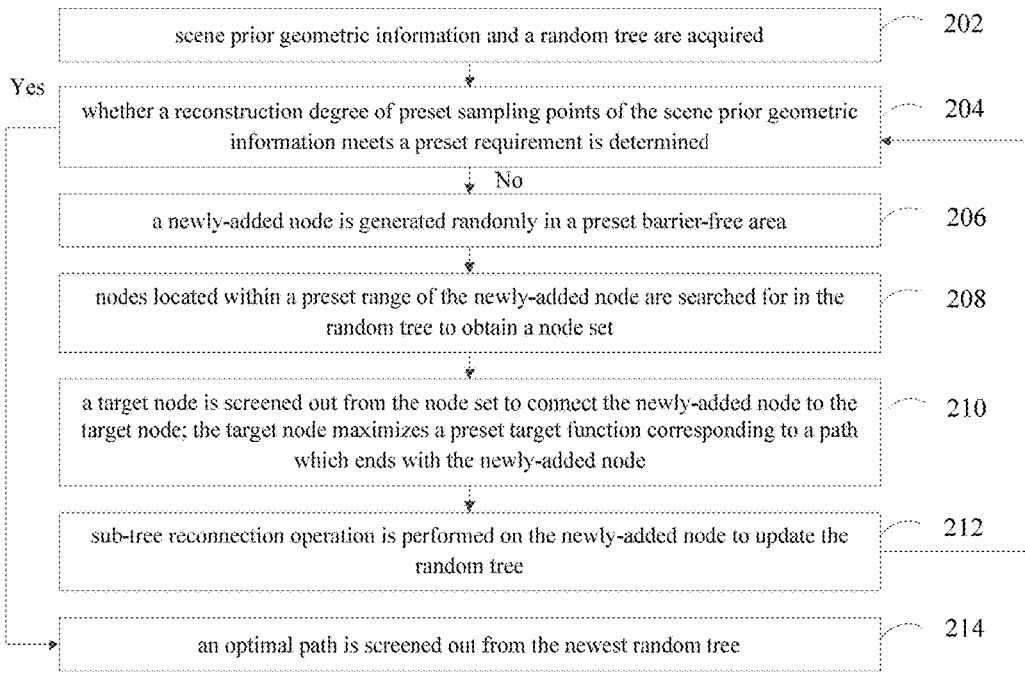
FIG. 1 is a flowchart of a method for continuous path planning in an embodiment.

In an embodiment, as shown in FIG. 1, a method for continuous path planning is provided. In the embodiment, the method is illustrated being applied to a server as an example. It is understandable that the method can also be applied to a terminal, as well as to a system including a terminal and a server whereby the method is implemented through the interaction of the terminal and the server. The path planning algorithm provided in the present disclosure performs planning based on a drone or a ground robot. The application mainly focuses on drones equipped with multi-lens cameras and single-lens cameras, and also applies to drones with other numbers and types of lens. The specific method uses Rapidly exploring Random Tree (RRT) as the main optimizer. At the same time, three optimization options are designed according to reconstruction completeness, efficiency, and smoothness. The three optimization options can be weighted according to different purposes to achieve the objective of the task. In the present embodiment, the method includes the following steps:

Step 202, scene prior geometric information and a random tree are acquired;

The scene prior geometric information refers to the prior geometric information of the target scene, including the three-dimensional representation data and sampling points (i.e., the local area of the scene) of the target to be reconstructed in the scene. The random tree is marked as G=<V, E>, where V←{$w_{start}$} is a node list of the random tree, and E←φ represents the expansion relationship between nodes.

As shown in FIG. 1, in an embodiment, the acquiring the random tree includes: acquiring a starting navigation point and lens orientation corresponding to the starting navigation point, and initializing the random tree with the starting navigation point and the lens orientation corresponding to the starting navigation point as a root node.

In the present embodiment, the starting navigation point can be generated according to the prior geometric information of the scene or randomly and marked as $w_{start}$. In practical application, each navigation point records the lens orientation at the position of the navigation point. In the present embodiment, the starting navigation point and the lens orientation on the starting navigation point can be used as the root node to initial the random tree, and then enter the process of expanding the random tree.

Figure 2:
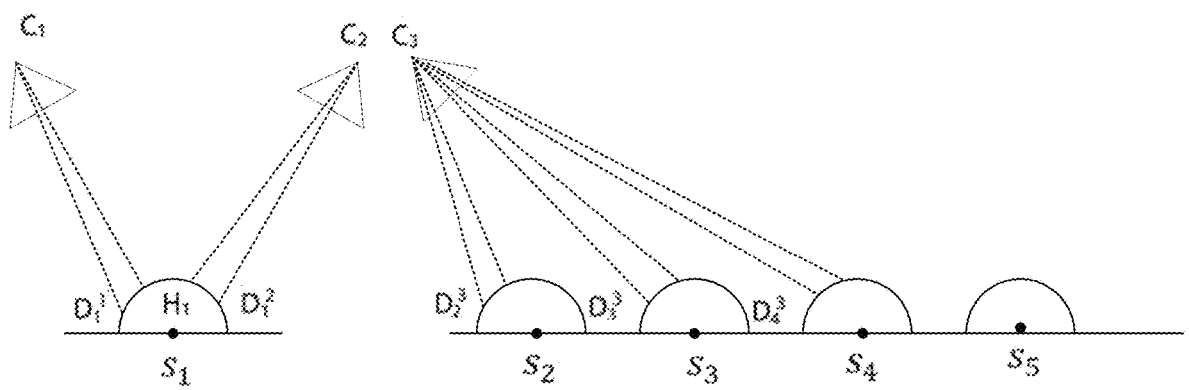
FIG. 2 is a schematic diagram of sampling of sampling points by camera in an embodiment.

Step 204, whether a reconstruction degree of preset sampling points of the scene prior geometric information meets a preset requirement is determined;

When the condition of rough prior geometric information of the target scene to be reconstructed is known, it is necessary to determine whether each sampling point (local area) of the target scene can be well reconstructed. For this purpose, in the present embodiment, a metric formulation is defined to predict whether a specific part, that is, a preset sampling point, can be well reconstructed by existing images. Refer to FIG. 2 for details, where $C_i$ represents the camera, $S_j$ represents the sampling point on the rough prior geometric, and $D_j^i$ represents the contribution degree of the camera $C_i$ to $S_j$ and the surrounding portion thereof. As shown in FIG. 2, a camera may have reconstruction contribution degree to multiple sampling local areas, and the reconstruction contribution degree of a sampling local area comes from multiple cameras. $D_j^i$ is a circle whose center is the intersection of ($c_j$, $s_i$) and the hemisphere H, and the radius calculation is based on the angle between $|c_j s_i|$ and the normal vector of ($c_j$, $s_i$) and $s_i$.

First, the reconstruction contribution degree (information gain) of each image capturing device such as the camera $c_j$ is defined:

$$g(c_j) = \sum_i \int_{D_i^j \setminus \cup_{k=1}^{j-i} D_i^k} (h) dh$$

Where $D_i^j$ is the coverage of the camera $c_j$ to a local area, that is, the preset sampling point $s_i$. There are several cameras in a path segment. Based on this, the reconstruction contribution degree of the path segment to a local area can be defined:

$$g^*(w_k) = \sum_{c \in \{c_{m+1}, c_{m+2}, \ldots, c_{m+n}\}} g(c_j)$$

Where $w_k$ represents a path segment that ends at the navigation point $w_k$, $\{c_{m+1}, c_{m+2}, \ldots, c_{m+n}\}$ are the cameras included in the path segment.

Based on the reconstruction contribution degree of the path segment to a local area, the reconstruction completeness optimization function $E_g(T)$ aimed at making the scene reconstructed as much as possible is defined:

$$E_g(T) = \sum_{k=2}^{n} g^*(w_k)$$

In addition, in order to make the path obtained in the planning process as smooth as possible and the capturing efficiency along the path as high as possible, the following consumption function is defined:

$$C_t(w_k) = 2.25 - 0.16(\theta_k - \pi)^2$$

$$C_m(w_k) = |w_k - w_{k-1}|$$

Where $\theta_k$ is the turning angle of the path at the navigation point $w_k$, $C_t(w_k)$ is driving steering consumption function, $C_m(w_k)$ is travel distance consumption function. Then, based on the consumption function and the reconstruction completeness optimization function, the path effectiveness optimization function $E_e(T)$ aimed at making the capturing path more effective and the path smoothness optimization function $E_t(T)$ aimed at making the capturing path smoother are defined:

$$E_e(T) = \frac{\sum_{k=2}^{n} g^*(w_k)}{\sum_{k=2}^{n} C_m(w_k)}$$

$$E_t(T) = \sum_{k=2}^{n-1} c_t(w_k)$$

Finally, based on the reconstruction completeness optimization function $E_g(T)$, the path effectiveness optimization function $E_e(T)$, and the path smoothness optimization function $E_t(T)$, the target function $E(T)$ to optimize the path is defined:

$$E(w_n) = E(T) = E_g(T) + \alpha_e E_e(T) - \alpha_t E_t(T)$$

Where $T = \{w_1, w_2, \ldots, w_n\}$ represents a planned complete path.

Based on the optimization function, the Rapidly exploring Random Tree is used as optimizer. The node in the tree represents the navigation point $w_k$, the edge between nodes represents path segment $(w_{k'}, w_k)$, and the value of the node is $E(T)$.

In the present embodiment, the reconstruction contribution degree of the path segment to the preset sampling point $s_i$ can be calculated according to the reconstruction contribution degree of the camera defined above. If the reconstruction contribution degree of the preset sampling point $s_i$ is larger than a preset reconstruction contribution degree threshold, it is determined that the reconstruction degree of the sampling point $s_i$ meets a preset requirement, and step 214 is entered. Otherwise, it is determined that the reconstruction degree of the preset sampling point $s_i$ does not meet the preset requirement, and step 206 is entered.

Step 206, a newly-added node is generated randomly in a preset barrier-free area if the reconstruction degree of the preset sampling points does not meet the preset requirement.

The preset barrier-free area is a safety area. If the reconstruction degree of the preset sampling points does not meet the preset requirement, random sampling is performed in the barrier-free safety area, and the newly-added node that can be reached by the random tree is randomly generated and marked as $w_{new}$.

Step 208, nodes located within a preset range of the newly-added node are searched for in the random tree to obtain a node set.

When the newly-added node is generated, it is necessary to connect the newly-added node to the nodes of the random tree to expand the random tree and output an optimal path. Specifically, nodes within the range of the newly-added node can be searched for in the node list V of the random tree to obtain the node set N.

Step 210, a target node is screened out from the node set to connect the newly-added node to the target node; the target node maximizes a preset target function corresponding to a path which ends with the newly-added node.

In order to ensure that the planned path is the optimal path, it is necessary to screen out an optimal node from the node list of the random tree to connect to the newly-added node. A node which makes the target function corresponding to the path $\{w_{start}, \ldots, w_{new}\}$ from the starting navigation point $w_{start}$ to $w_{new}$ reaches the maximum value can be screened out. Specifically, for each node in the node list of the random tree, the parameters required to calculate the preset target function are acquired, such as reconstruction contribution degree, distance, and lens steering angle. The above parameters are substituted into the expression of the target function to calculate the value of the target function corresponding to the path segment from each node to the newly-added node. Then, the function value are compared to screen out the largest function value and mark it as a target node $w_p$, and then the newly-added node $w_{new}$ is connected to $w_p$, so that $w_{new}$ is connected to the random tree through $w_p$.

Figure 3:
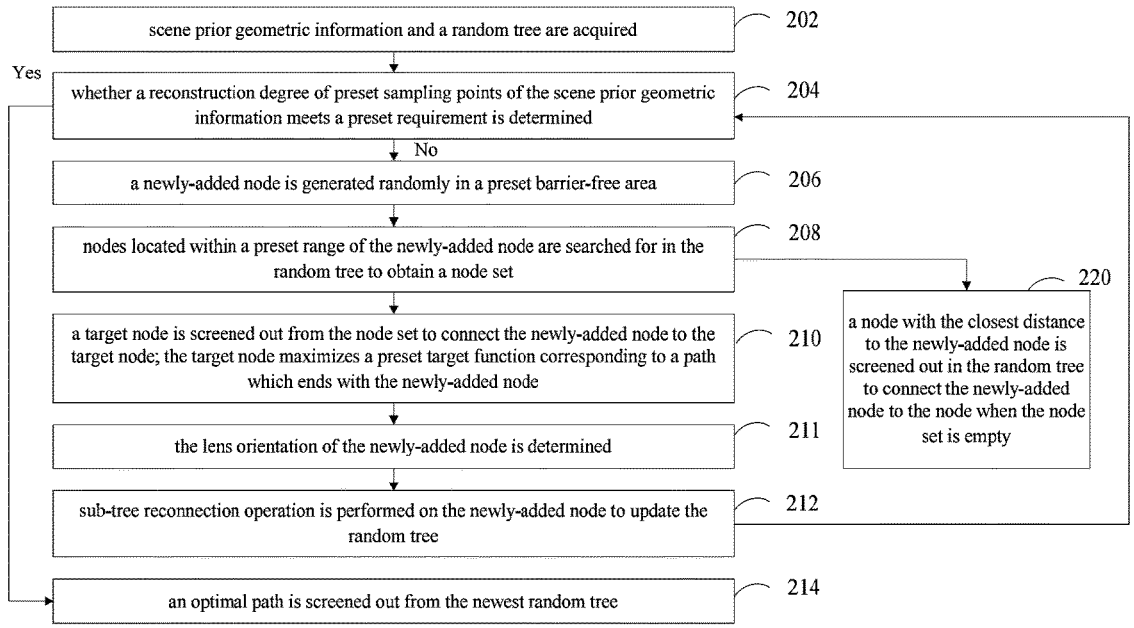
FIG. 3 is a detailed flowchart of a method for continuous path planning in another embodiment.

As shown in FIG. 3, in an embodiment, the method further includes step 220 after searching in the random tree for the nodes located within the preset range of the newly-added node to obtain the node set:

a node with the closest distance to the newly-added node is screened out in the random tree to connect the newly-added node to the node when the node set is empty.

During the process of expanding the random tree, if no node within the preset range of the newly-added node is found in the node list of the random tree, that is, when the node set is empty, the node with the closest distance to the newly-added node is selected in the node list of the random tree as the target node. The newly-added node is connected to the node and step 212 is entered.

Step 212, sub-tree reconnection operation is performed on the newly-added node to update the random tree, and the step 204 is returned to.

The newly-added node is connected to the random tree. Similarly, the sub-tree of the newly-added node is reconnected. Specifically, a random tree <V, E> and a node w to be reconnected are acquired. A queue Q={w} is initialized. The first element of Q is extracted and marked as w*. The i=1 is initialized, and a node within a preset range r of w* but not an ancestor node thereof is searched in V to obtain a node set M={w_1, ..., w_n}. The value of target function E(T) corresponding to all paths through the node w_i (0<i<n) is calculated, and the maximum value of E(T) is marked as v_old. Then, the maximum value of E(T) obtained by all paths through the node w_i is calculated and marked as v_new if w_i is connected to w*, and w_i is reconnected to w* if v_new is greater than v_old, otherwise i=i+1 and return to the step of calculating the value of the target function E(T) corresponding to all paths through the node w_i (0<i<n) until the reconnection operation is completed, and the random tree is updated and then the step 204 is returned to.

Step 214, an optimal path is screened out from the newest random tree when the reconstruction degree of the preset sampling points meets the preset requirement; and the optimal path maximizes the preset target function.

After the sub-tree reconnection operation of the newly-added node is completed, the random tree includes multiple path that can cover $s_i$ at the time when the reconstruction degree meets the preset requirement and the preset sampling point $s_i$ can be well covered, and a path that can maximize the target function is selected as the optimal path from multiple paths according to the target function E(T).

The above path planning method designs the optimization function based on the rapidly exploring random tree to plan a path, and the optimal path is screened out from the random tree according to target function including the reconstruction completeness optimization function, the path effectiveness optimization function, and the path smoothness optimization function when the reconstruction degree of the preset sampling points is determined to meet the preset requirement. The above method eliminates the conventional approach of taking viewpoint as the optimization object and takes the path as the optimization object to design the path smoothness optimization function. The influence of the path smoothness degree on collection time and energy consumption is taken into account, so that the planned path is shorter and smoother, thereby saving time and energy consumption of data collection. At the same time, the path effectiveness optimization function and the reconstruction completeness optimization function are designed, which can further improve the effectiveness and quality of the data collected. In summary, the method provided in the present disclosure can effectively improve the efficiency of data collection.

Figure 4:
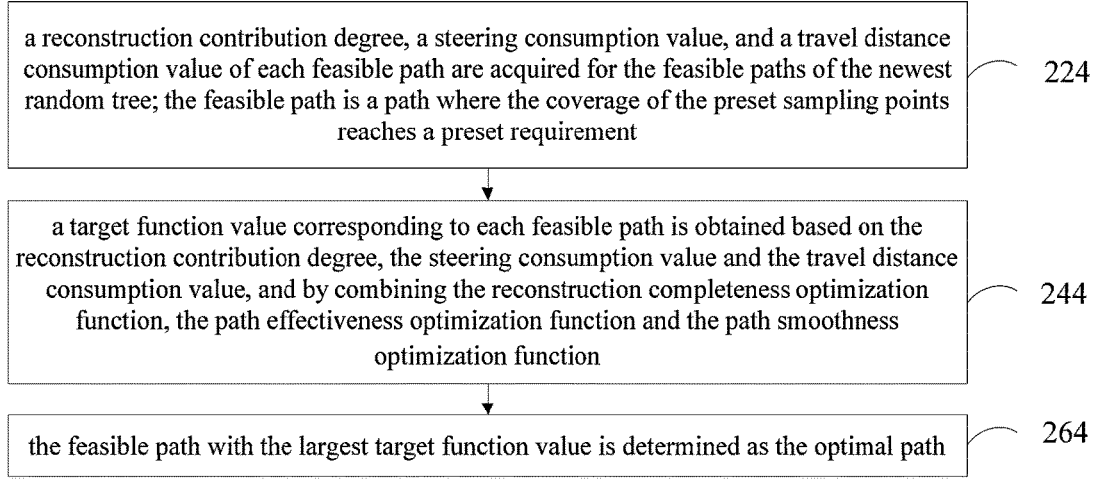
FIG. 4 is a flowchart of steps of screening out an optimal path from the newest random tree in an embodiment.

As shown in FIG. 4, in an embodiment, the screening out an optimal path from the newest random tree includes:
- step 224, a reconstruction contribution degree, a steering consumption value, and a travel distance consumption value of each feasible path are acquired for the feasible paths of the newest random tree; the feasible path is a path where the coverage of the preset sampling points reaches a preset requirement;
- step 244, a target function value corresponding to each feasible path is obtained based on the reconstruction contribution degree, the steering consumption value, and the travel distance consumption value, and by combining the reconstruction completeness optimization function, the path effectiveness optimization function, and the path smoothness optimization function;
- step 264, the feasible path with the largest target function value is determined as the optimal path.

Taking drones as an example, the steering consumption value is the flight steering consumption value, and the travel distance consumption value is flight distance consumption value. In a specific implementation, there are multiple cameras on a path, and the optimal path screening can be dividing each path into multiple path segments with the navigation point as the dividing point, for example, $w_k$ represents a path segment that ends at navigation point $w_k$. The reconstruction contribution degree $g(c_j)$ of each feasible path on each path segment is acquired, and then the reconstruction contribution degree of all camera points are summed up to obtain reconstruction contribution degree $g^*(w_k)$ of the path segment $w_k$ to the preset sampling point $s_i$ and then reconstruction contribution degree $E_g(T)$ corresponding to the entire path is obtained. Similarly, the lens steering angle of each navigation point and the distance between navigation points are acquired, and by combining the driving steering consumption function and the travel distance consumption function, flight steering consumption value and flight distance consumption value of each path are obtained, and then the value of the path effectiveness optimization function $E_e(T)$, and the path smoothness optimization function $E_t(T)$ are obtained. Then, the value of the target function of each path is obtained according to the function expression of E(T). Finally, the path with the largest target function value is determined as the optimal path. In the present embodiment, three optimization functions are designed so that the optimal path planned is the most efficient path. Further, three optimization functions are designed according to reconstruction completeness, effectiveness, and smoothness. Three optimization functions can be weighted according to different purposes to achieve the objective of the task.

In an embodiment, the acquiring the reconstruction contribution degree of each feasible path includes: acquiring a known reconstruction contribution degree set; finding in the reconstruction contribution degree set the reconstruction contribution degree corresponding to the image capturing device closest to a current image capturing device to obtain a target reconstruction contribution degree; determining the target reconstruction contribution degree as the reconstruction contribution degree of the current image capturing device; and obtaining a reconstruction contribution degree of each feasible path based on the reconstruction contribution degree of the image capturing device on each feasible path.

The reconstruction contribution degree set can also be referred to as view information (VIF). The image capturing device includes camera and other devices used to capture image data. The camera is taken as an example in the present embodiment. In practical application, since the calculation of the target function value is complicated and time-consuming, the view information is designed to speed up the calculation and save time. Therefore, in the calculation process, the reconstruction contribution degree brought by the actual position and orientation of the node is no longer truly calculated. Instead, the reconstruction contribution degree of the camera point closest to the current camera is found in the view information based on each camera in the path, and then the found reconstruction contribution degree is taken as the reconstruction contribution degree of the current camera. By this way, the reconstruction contribution degree of each camera point in the path is obtained, and then the reconstruction contribution degree of each feasible path is obtained, which improves the speed of the algorithm.

As shown in FIG. 3, in an embodiment, the acquiring the steering consumption value of each feasible path includes: determining lens orientation of each node on the feasible path; and obtaining the steering consumption value of each feasible path according to the lens orientation of each node.

In practical application, the drones are equipped with multi-lens cameras and single-lens cameras, so the path planning can be sub-divided into multi-lens path planning algorithm and single-lens path planning algorithm. For the multi-lens cameras, since the lens itself does not move, the lens orientation thereof can be ignored in the planning process and defaults to the set lens orientation value. For the path planning of the single-lens cameras, the lens orientation of the drone camera needs to be determined. Here, the lens orientation of the navigation points of the root node is pre-determined, so every time a new node (navigation point) is added, the lens orientation of the new node needs to be determined, and every time when an existing node in the random tree needs to be reconnected to other nodes, the lens orientation also needs to be updated. Therefore, when the newly-added node is connected to the target node, the lens orientation of the newly-added node needs to be determined. Based on the driving steering consumption function, it is known that to obtain target function value of each path, it is necessary to know the lens orientation of each node to plan the optimal path.

In an embodiment, the determining the lens orientation of each node on the feasible path includes: acquiring lens parameters of the image capturing device and a preset lens orientation; determining the lens orientation of a current node as the preset lens orientation when the lens parameters of the image capturing device is characterized as multi-lens; obtaining position information of the current node and position information and lens orientation of the parent node of the current node when the lens parameters of the image capturing device is characterized as single-lens, and executing preset lens orientation calculation strategy based on the position information of the current node and the position information and the lens orientation of the parent node of the current node to determine lens orientation of the current node, and then determining the lens orientation of each node on the feasible path.

Specifically, the lens parameters of the image capturing device include camera lens parameters. The calculation strategy of the lens orientation is as follow: the lens orientation between navigations of the single-lens camera is determined by the distance interpolation of the forward and backward navigation point. Specifically, coordinates of a parent node w_a, lens orientation horizontal angle a_1 and vertical angle a_2 of the parent node w_a, and coordinates of a child node w_b are acquired. A maximum reconstruction contribution degree v_max=0 of this path segment, camera angle (b_1, b_2)=(0, 90) of the corresponding child node, and a temporary camera angle (b*_1, b*_2)=(0, 90) are initialized. The temporary camera angle is increased by 45 degrees rotation, and a path segment (w_a, w_b) and a drone camera capturing distance are divided into a viewpoint set {w_1, . . . , w_n}. The lens angle of each viewpoint in the viewpoint set is interpolated according to the distance and the camera angle of w_a (a_1, a_2) and w_b (b_1, b_2), and the reconstruction contribution degree v=g*(w$_b$) of this path segment is calculated. If v is greater than a current maximum reconstruction contribution degree v_max, then v_max=v, (b_1, b_2)=(b*_1, b*_2), and the lens orientation of w_b is determined. Continuing the above embodiment, specifically in determining the lens orientation of the newly-added node w_new, the newly-added node w_new can be regarded as a child node, and the target node can be regarded as parent node. The lens orientation of the newly-added node can be determined according to the lens orientation calculation strategy. After the newly-added node is connected to the target node, the camera lens parameters and preset lens orientation are acquired to identify whether the camera is a single-lens camera or a multi-lens camera. If it is multi-lens camera, the lens orientation of the newly-added node is still the preset lens orientation by default. If it is single-lens camera, the position of the newly-added node, as well as the position information and the lens orientation of the target node are acquired. Based on the position information of the newly-added node, as well as the position information and the lens orientation of the target node, the preset lens orientation calculation strategy is executed to determine the lens orientation of the newly-added node. In the present embodiment, the lens orientation of the node is determined according to the distance interpolation, which can simply and quickly determine the lens orientation of each node, and then the value of the target function is obtained quickly to plan the optimal path, which improves the speed of the algorithm.

In order to verify the effectiveness and superiority of the path planning method provided in the present disclosure, simulation experiments and real experiment were implemented on the path planning method provided in the present disclosure.

Figure 5A:
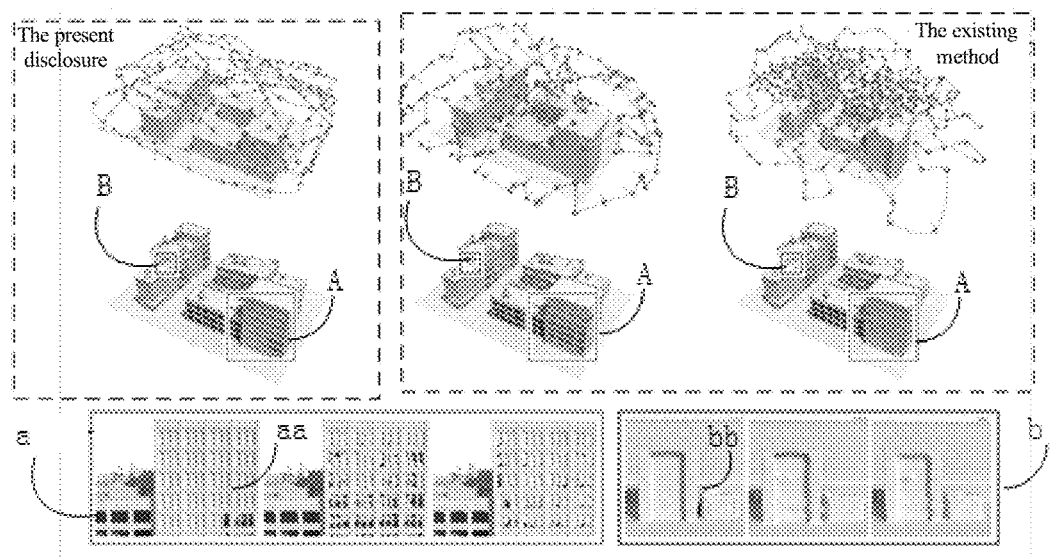
FIG. 5(a) is a schematic diagram of comparison of paths planning and scene reconstruction results between the present disclosure and the prior art in a simulation experiment in an embodiment.

Simulation experiment: a path planning is performed for a given virtual scene using the present algorithm in a virtual environment and a commercial software is used to reconstruct the captured images. The reconstruction result is shown in FIG. 5(a). The first row of FIG. 5(a): a schematic diagram of comparison of the paths planned by the present disclosure and by the existing method; The second row of FIG. 5(a): a schematic diagram of comparison of the scene reconstruction results of the present disclosure and the existing method; The third row of FIG. 5(a): part a shows a comparative enlarged view of detail A in the second row of the present disclosure and of the existing method, where aa corresponds to a comparative enlarged view of detail A of the present disclosure, and part b shows a comparative enlarged view of detail B in the second row of the present disclosure and the existing method, where bb corresponds to a comparative enlarged view of detail B of the present disclosure.

Figure 5B:
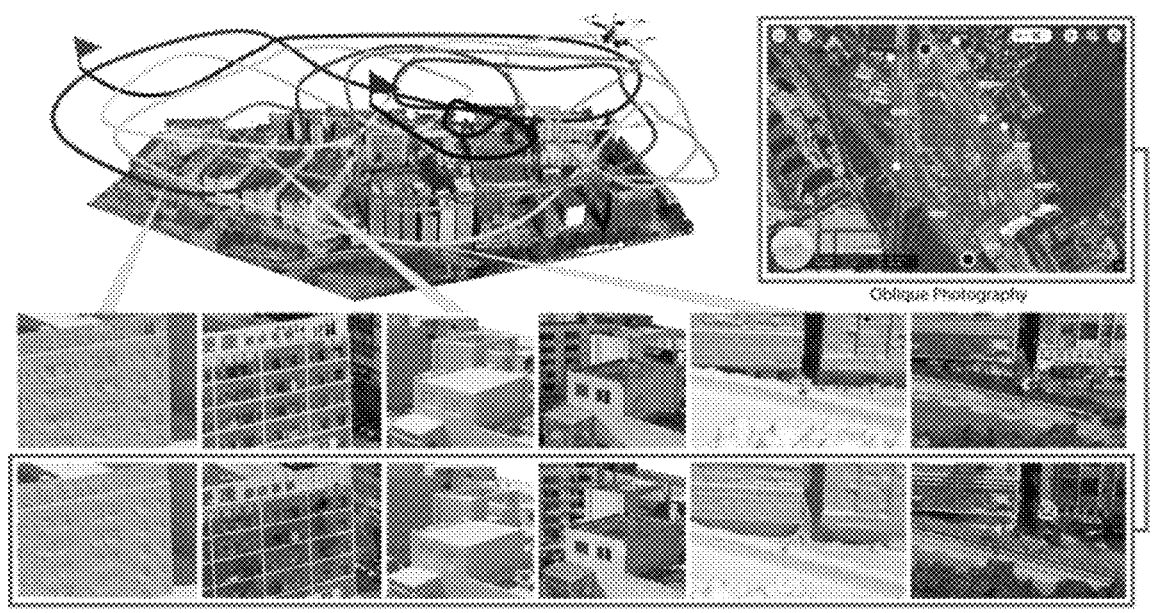
FIG. 5(b) is a schematic diagram of comparison of paths planning and scene reconstruction results between the present disclosure and the prior art in a real experiment in an embodiment.

Real experiments: real scene is more complicated than simulation scene. A certain real area is used as a target area to be reconstructed for continuous path planning, and the captured images are reconstructed with commercial software, and the reconstruction results as shown in FIG. 5(b) are obtained. The first row of FIG. 5(b): the left is a data collection path planned by the path planning algorithm of the present disclosure, the right is a data collection path planned by the oblique photography method; the second row of FIG. 5(b): a reconstruction result based on the images captured by the path planning algorithm of the present disclosure; the third row of FIG. 5(b): a reconstruction result based on the images captured by the oblique photography method.

It can be seen from the above FIG. 5(a) and FIG. 5(b) that the photos are taken continuously based on the path planning algorithm provided by the present disclosure, which rarely miss scene information. Therefore, the path planning method of the present disclosure can be used to plan a collection path with high-quality collection, high-efficiency, and low-energy consumption, which makes the scene reconstructed by the path planning method provided by the present disclosure completer and more reliable than other methods.

It should be understood that although the steps in the flowcharts are displayed in order according to the arrows, the steps are not definitely executed in the order indicated by the arrows. Unless clearly stated in this article, the execution of these steps is not strictly limited in order, and these steps can be executed in other orders. Moreover, at least some of the steps in the flowcharts may include multiple sub-steps or multiple stages. These sub-steps or stages are not definitely executed at the same time, but may be performed at different time, the execution order of these sub-steps or stages is not definitely sequential, but may be executed in turns or alternately with at least a part of other steps or sub-steps or stages of other steps.

Figure 6:
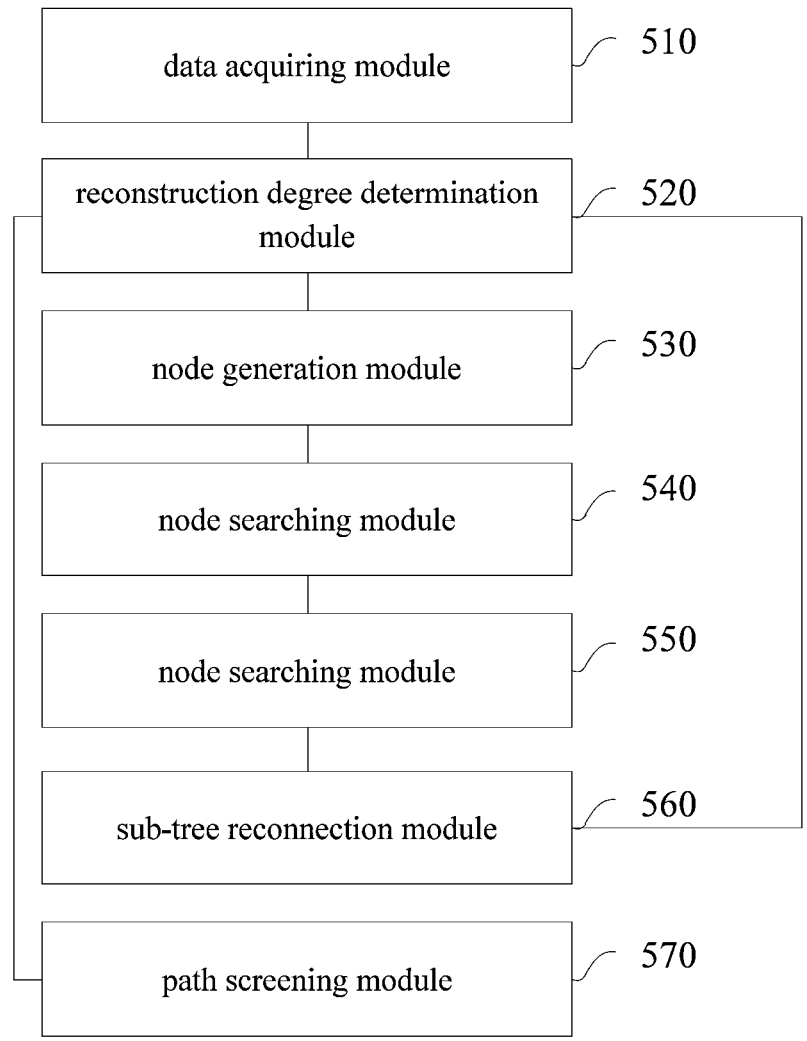
FIG. 6 is a block diagram of a structure of an apparatus for path planning in an embodiment.

In an embodiment, as shown in FIG. 6, an apparatus for continuous path planning is provided, including: a data acquiring module 510, a reconstruction degree determination module 520, a node generation module 530, a node searching module 540, a node connection module 550, a sub-tree reconnection module 560, and a path screening module 570:

the data acquiring module 510 is configured to acquire scene prior geometric information and a random tree;

the reconstruction degree determination module 520 is configured to determine whether a reconstruction degree of preset sampling points of the scene prior geometric information meets a preset requirement;

the node generation module 530 is configured to generate a newly-added node randomly in a preset barrier-free area if the reconstruction degree of the preset sampling points does not meet the preset requirement;

the node searching module 540 is configured to search in the random tree for nodes located within a preset range of the newly-added node to obtain a node set;

the node connection module 550 is configured to screen out a target node from the node set to connect the newly-added node to the target node; the target node maximizes a preset target function corresponding to a path which ends with the newly-added node;

the sub-tree reconnection module 560 is configured to perform sub-tree reconnection operation on the newly-added node to update the random tree, and return to the step of determining whether a reconstruction degree of preset sampling points of the scene prior geometric information meets a preset requirement; and the path screening module 570 is configured to screen out an optimal path from the newest random tree when the reconstruction degree of the preset sampling points meets the preset requirement; the optimal path maximizes the preset target function;

the preset target function comprises reconstruction completeness optimization function, path effectiveness optimization function, and path smoothness optimization function.

In an embodiment, the path screening module 570 is further configured to acquire a reconstruction contribution degree, a steering consumption value, and a travel distance consumption value of each feasible path for the feasible paths of the newest random tree; the feasible path is a path where the coverage of the preset sampling points reaches a preset requirement; obtain target function value corresponding to each feasible path based on the reconstruction contribution degree, the steering consumption value, and the travel distance consumption value, and by combining the reconstruction completeness optimization function, the path effectiveness optimization function, and the path smoothness optimization function; determine the feasible path with the largest target function value as the optimal path.

In an embodiment, the path screening module 570 is further configured to acquire a known reconstruction contribution degree set; find in the reconstruction contribution degree set the reconstruction contribution degree corresponding to the image capturing device closest to a current image capturing device to obtain a target reconstruction contribution degree; determine the target reconstruction contribution degree as the reconstruction contribution degree of the current image capturing device; obtain a reconstruction contribution degree of each feasible path based on the reconstruction contribution degree of the image capturing device on each feasible path.

Figure 7:
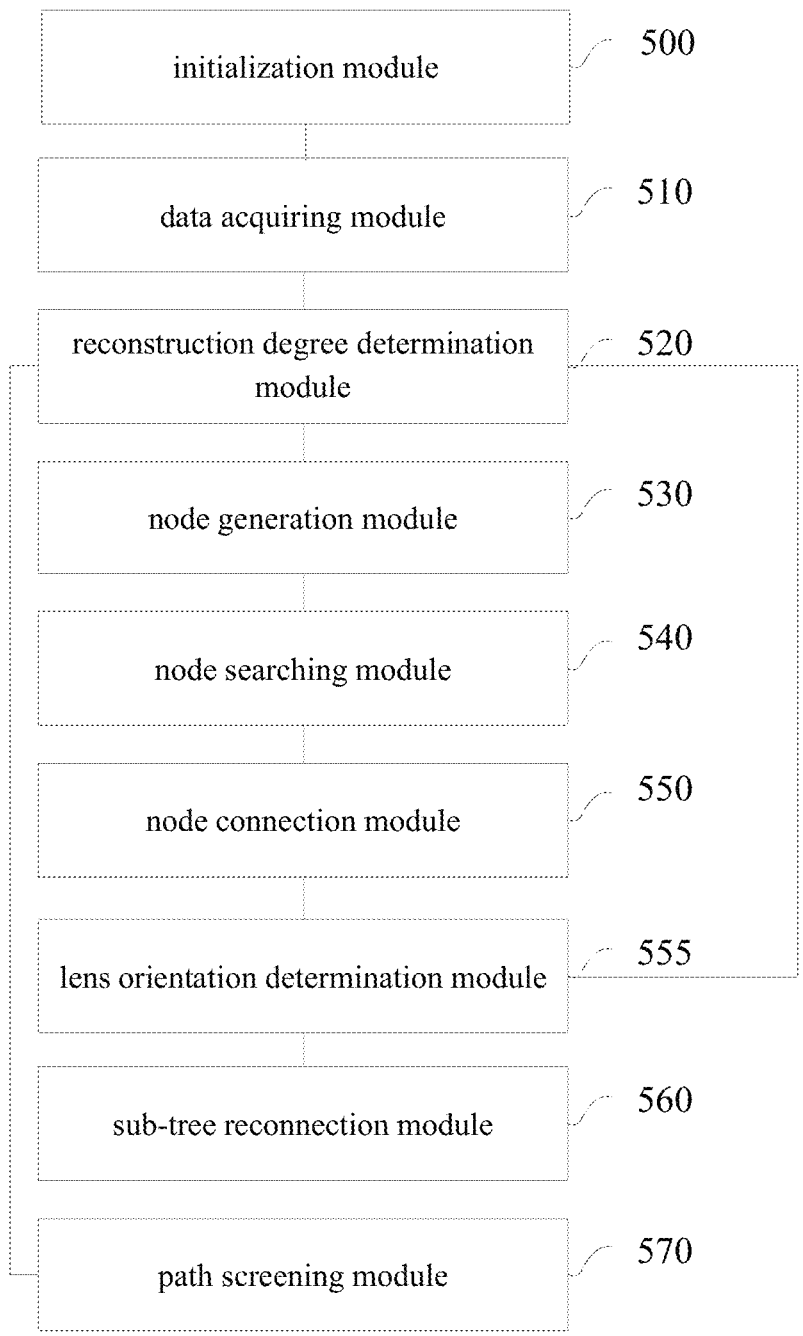
FIG. 7 is a block diagram of a structure of an apparatus for continuous path planning in another embodiment.

As shown in FIG. 7, in an embodiment, the apparatus further includes a lens orientation determination module 555, which is configured to determine lens orientation of each node on the feasible path; obtain the steering consumption value of each feasible path according to the lens orientation of each node.

In an embodiment, the lens orientation determination module 555 is further configured to acquire lens parameters of the image capturing device and a preset lens orientation; determine lens orientation of a current node as the preset lens orientation when the lens parameters of the image capturing device is characterized as multi-lens; obtain position information of the current node and position information and lens orientation of the parent node of the current node when the lens parameters of the image capturing device is characterized as single-lens, and execute preset lens orientation calculation strategy based on the position information of the current node and the position information and the lens orientation of the parent node of the current node to determine lens orientation of the current node, and then determine the lens orientation of each node on the feasible path.

In an embodiment, the node connection module 550 is further configured to screen out in the random tree a node with the closest distance to the newly-added node to connect the newly-added node to the node when the node set is empty after searching in the random tree for the nodes located within the preset range of the newly-added node to obtain the node set.

As shown in FIG. 7, in an embodiment, the apparatus further includes initialization module 500, which is configured to acquire a starting navigation point and lens orientation corresponding to the starting navigation point; initialize the random tree with the starting navigation point and the lens orientation corresponding to the starting navigation point as a root node.

For specific embodiments of the apparatus for continuous path planning can refer to the above embodiments of the method for continuous path planning, which will not be repeated herein again. Each module in the above apparatus for continuous path planning may be implemented in whole or in part by software, hardware, or a combination thereof. The above modules may be embedded in the hardware or independent of the processor in a computer device, or may be stored in a memory in the computer device in the form of software, so that the processor can call and execute the operations corresponding to the above modules.

Figure 8:
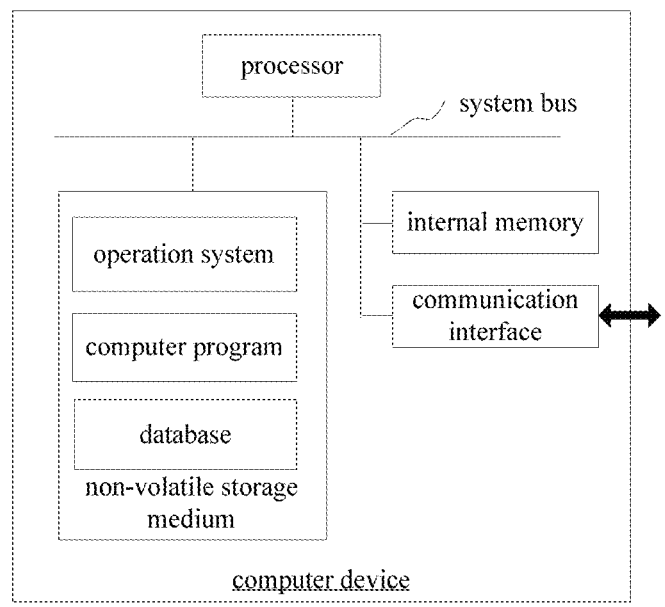
FIG. 8 is a schematic diagram of an internal structure of a computer device in an embodiment.

In an embodiment, a computer device is provided. The computer device can be a server, and internal structure diagram thereof may be as shown in FIG. 8. The computer device includes a processor, a memory, and a communication interface connected through a system bus. The processor of the computer device is used to provide calculation and control capabilities. The memory of the computer device includes a non-volatile storage medium and an internal memory. The non-volatile storage medium stores an operating system, a computer program, and a database. The internal memory provides an environment for the operation of the operating system and computer programs in the non-volatile storage medium. The database of the computer device is used to store data of the scene prior geometric information and the random tree. The communication interface of the computer device is used for wired or wireless communication with an external terminal. The computer program is executed by the processor to implement a method for continuous path planning.

Those of ordinary skill in the art may understand that the structure shown in FIG. 8 in only a block diagram of a part of the structure related to the solution of the present disclosure, and does not constitute a limitation on the computer device to which the solution of the present disclosure is applied. The specific computer device may include more or less parts shown in the figure, or combine other parts, or have a different arrangement of parts.

In an embodiment, a computer device is provided, including a processor and a memory storing a computer program, when the computer program is executed, the processor implements the steps of the above method for continuous path planning.

In an embodiment, a computer-readable storage medium is provided, which stores a computer program. The computer program is executed by a processor to implements the steps of the above method for continuous path planning.

Those of ordinary skill in the art may understand that all or part of the processes in the method of the above embodiments may be completed by instructing relevant hardware through a computer program, and the computer program may be stored in a non-transitory computer readable storage medium, when the computer program is executed, the process of the foregoing method embodiments may be included. Any reference to the memory, storage, database or other media used in the embodiments provided in this disclosure may include non-transitory and/or transitory memory. Non-transitory memory may include read-only memory (ROM), programmable ROM (PROM), electrically programmable ROM (EPROM), electrically erasable programmable ROM (EEPROM), or flash memory. Volatile memory can include random access memory (RAM) or external cache memory. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain (Synch link) DRAM (SLDRAM), memory bus (Rambus) direct RAM (RDRAM), direct memory bus dynamic RAM (DRDRAM), and memory bus dynamic RAM (RDRAM), etc.

The technical features of the above-mentioned embodiments can be combined arbitrarily. In order to make the description concise, all possible combinations of the various technical features in the above-mentioned embodiments are not described herein. However, as long as there is no contradiction in the combination of these technical features, all should be considered as the scope of the present disclosure.

The above-mentioned embodiments are merely some exemplary embodiments of the present disclosure, and their descriptions are more specific and detailed, but they should not be understood as a limitation on the scope of the present disclosure. It should be pointed out that those of ordinary skill in the art can make several modifications and improvements without departing from the concept of the disclosure, and these all fall within the protection scope of the present disclosure. Therefore, the scope of protection of the present disclosure shall be subject to the appended claims.

What is claimed is:

1. A method for continuous path planning, the method being implemented by a processor to execute a computer program stored on a memory, and comprising:
    acquiring scene prior geometric information and a random tree;
    determining whether a reconstruction degree of preset sampling points of the scene prior geometric information meets a preset requirement;
    in response to a negative result of the determining:
        generating a newly-added node randomly in a preset barrier-free area if the reconstruction degree of the preset sampling points does not meet the preset requirement;
        searching in the random tree for nodes located within a preset range of the newly-added node to obtain a node set;
        screening out a target node from the node set, and connecting the newly-added node to the target node; wherein the target node is a node that maximizes a preset target function corresponding to a path which ends with the newly-added node;
        acquiring a node to be reconnected, and reconnecting a sub-tree of the newly-added node to update the random tree, and returning to the determining;
    in response to a positive result of the determining, screening out an optimal path from a newest random tree; wherein the optimal path is a path that maximizes the preset target function;
    directing a drone or ground robot along the optimal path to perform data gathering;
    wherein the preset target function comprises a reconstruction completeness optimization function, a path effectiveness optimization function, and a path smoothness optimization function, the reconstruction degree of the preset sampling points is obtained based on prediction of a reconstruction contribution degree of the preset sampling points by a feasible path in the newest random tree, the reconstruction contribution degree of the preset sampling points by a feasible path is defined:

$$g*(w_k) = \sum_{c \in \{c_{m+1}, \ldots, c_{m+2}, \ldots, c_{m+n}\}} g(c_j)$$

where $w_k$ represents a path segment that ends at the navigation point $w_k$, $\{c_{m+1}, c_{m+2}, \ldots, c_{m+n}\}$ are cameras included in the path segment, $g(c_j)$ is the reconstruction contribution degree of an image capturing device $c_j$ of the cameras and is defined:

$$g(c_j) = \sum_i \int_{D_i^j \setminus \cup_{k=1}^{j-1} D_i^k} (h) dh$$

where $D_i^j$ is the coverage of the image capturing device $c_j$ to the preset sampling point $s_i$ and h is a hemisphere;
wherein the reconstruction completeness optimization function $E_g(T)$ is defined:

$$E_g(T) = \sum_{k=2}^{n} g*(w_k)$$

the path effectiveness optimization function $E_e(T)$ and the path smoothness optimization function $E_t(T)$ are defined:

$$E_e(T) = \frac{\sum_{k=2}^{n} g*(w_k)}{\sum_{k=2}^{n} C_m*(w_k)}$$

$$E_t(T) = \sum_{k=2}^{n-1} c_t(w_k)$$

where $C_t(w_k)$ is a driving steering consumption function and is defined:

$$C_t(w_k) = 2.25 - 0.16(\theta_k - \pi)^2$$

where $\theta_k$ is a turning angle of the path at a navigation point $w_k$,
where $C_m(w_k)$ is a travel distance consumption function and is defined:

$$C_m(w_k) = |w_k - w_{k-1}|.$$

2. The method according to claim 1, wherein the screening out the optimal path from the newest random tree comprises:
acquiring the reconstruction contribution degree, a steering consumption value, and a travel distance consumption value of each feasible path for the feasible paths of the newest random tree;
wherein the feasible path is a path where the coverage of the preset sampling points reaches a preset requirement;
obtaining a target function value corresponding to each feasible path based on the reconstruction contribution degree, the steering consumption value, and the travel distance consumption value, and by combining the reconstruction completeness optimization function, the path effectiveness optimization function, and the path smoothness optimization function; and
determining the feasible path with the largest target function value as the optimal path.

3. The method according to claim 2, wherein the acquiring the reconstruction contribution degree of each feasible path comprises:
acquiring a known reconstruction contribution degree set;
finding in the reconstruction contribution degree set the reconstruction contribution degree corresponding to an image capturing device closest to a current image capturing device to obtain a target reconstruction contribution degree;
determining the target reconstruction contribution degree as the reconstruction contribution degree of the current image capturing device; and
obtaining a reconstruction contribution degree of each feasible path based on the reconstruction contribution degree of the image capturing device on each feasible path.

4. The method according to claim 2, wherein the acquiring the steering consumption value of each feasible path comprises:
determining lens orientation of the image capturing device of each node on the feasible path; and
obtaining the steering consumption value of each feasible path according to the lens orientation of each node.

5. The method according to claim 4, wherein the determining the lens orientation of each node on the feasible path comprises:
acquiring lens parameters of the image capturing device and a preset lens orientation;

determining lens orientation of a current node as the preset lens orientation when the lens parameters of the image capturing device are characterized as multi-lens; and
obtaining position information of the current node and position information and lens orientation of the parent node of the current node when the lens parameters of the image capturing device is characterized as single-lens, and executing preset lens orientation calculation strategy based on the position information of the current node and the position information and the lens orientation of the parent node of the current node to determine lens orientation of the current node, and then determining the lens orientation of each node on the feasible path.

6. The method according to claim 1, after the searching in the random tree for the nodes located within the preset range of the newly-added node to obtain the node set, the method further comprising:
screening out in the random tree a node with the closest distance to the newly-added node to connect the newly-added node to the node when the node set is empty.

7. The method according to claim 1, wherein the acquiring the random tree comprises:
acquiring a starting navigation point and lens orientation of the image capturing device corresponding to the starting navigation point; and
initializing the random tree with the starting navigation point and the lens orientation corresponding to the starting navigation point as a root node.

8. A computer device, comprising a processor and a memory storing a computer program, wherein the processor, when executing the computer program, implements the steps of the method of claim 1.

9. A non-transitory computer-readable storage medium on which a computer program is stored, the computer program is executed by a processor to implements the steps of the method of claim 1.

10. An apparatus for continuous path planning, comprising:
a processor;
a memory storing instructions that, when executed by the processor, cause the processor to perform operations comprising:
acquire scene prior geometric information and a random tree;
determine whether a reconstruction degree of preset sampling points of the scene prior geometric information meets a preset requirement;
in response to a negative result of the determine:
generate a newly-added node randomly in a preset barrier-free area if the reconstruction degree of the preset sampling points does not meet the preset requirement;
search in the random tree for nodes located within a preset range of the newly-added node to obtain a node set;
screen out a target node from the node set, and connect the newly-added node to the target node; wherein the target node is a node that maximizes a preset target function corresponding to a path which ends with the newly-added node;
acquire a node to be reconnected, and reconnect a sub-tree of the newly-added node to update the random tree, and return to determine;

in response to a positive result of the determining, screen out an optimal path from a newest random tree; wherein the optimal path is a path that maximizes the preset target function; and direct a drone or ground robot along the optimal path to perform data gathering;

wherein the preset target function comprises a reconstruction completeness optimization function, a path effectiveness optimization function, and a path smoothness optimization function, the reconstruction degree of the preset sampling points is obtained based on prediction of a reconstruction contribution degree of the preset sampling points by a feasible path in the newest random tree, the reconstruction contribution degree of the preset sampling points by a feasible path is defined:

$$g^*(w_k) = \sum_{c \in \{c_{m+1}, c_{m+2}, \ldots c_{m+n}\}} g(c_j)$$

where $w_k$ represents a path segment that ends at the navigation point $w_k$, $\{c_{m+1}, c_{m+2}, \ldots, c_{m+n}\}$ are cameras included in the path segment, $g(c_j)$ is the reconstruction contribution degree of an image capturing device $c_j$ of the cameras and is defined:

$$g(c_j) = \sum_i \int_{D_i^j \cup_{k=1}^{j-1} D_i^k} (h) dh$$

where $D_i^j$ is the coverage of the image capturing device $c_j$ to the preset sampling point $s_i$ and h is a hemisphere;

wherein the reconstruction completeness optimization function $E_g(T)$ is defined:

$$E_g(T) = \sum_{k=2}^{n} g^*(w_k)$$

the path effectiveness optimization function $E_e(T)$ and the path smoothness optimization function $E_t(T)$ are defined:

$$E_e(T) = \frac{\sum_{k=2}^{n} g^*(w_k)}{\sum_{k=2}^{n} C_m(w_k)}$$

$$E_t(T) = \sum_{k=2}^{n-1} c_t(w_k)$$

where $C_t(w_k)$ is a driving steering consumption function and is defined:

$C_t(w_k) = 2.25 - 0.16(\theta_k - \pi)^2$ where $\theta_k$ is a turning angle of the path at a navigation point $w_k$, where $C_m(w_k)$ is a travel distance consumption function and is defined:

$C_m(w_k) = |w_k - w_{k-1}|$.

* * * * *